(12) United States Patent
Yamashita et al.

(10) Patent No.: US 12,115,504 B2
(45) Date of Patent: Oct. 15, 2024

(54) SEPARATION MEMBRANE

(71) Applicant: Toray Industries, Inc., Tokyo (JP)

(72) Inventors: Yuki Yamashita, Otsu (JP); Kentaro Tanaka, Otsu (JP); Takaaki Mihara, Otsu (JP); Tomoyuki Horiguchi, Otsu (JP)

(73) Assignee: Toray Industries, Inc., Tokyo (JP)

( * ) Notice: Subject to any disclaimer, the term of this patent is extended or adjusted under 35 U.S.C. 154(b) by 528 days.

(21) Appl. No.: 17/055,679

(22) PCT Filed: May 29, 2019

(86) PCT No.: PCT/JP2019/021260
§ 371 (c)(1),
(2) Date: Nov. 16, 2020

(87) PCT Pub. No.: WO2019/235315
PCT Pub. Date: Dec. 12, 2019

(65) Prior Publication Data
US 2021/0362097 A1    Nov. 25, 2021

(30) Foreign Application Priority Data

Jun. 5, 2018  (JP) .................................. 2018-107417

(51) Int. Cl.
*B01D 69/12* (2006.01)
*B01D 69/02* (2006.01)
(Continued)

(52) U.S. Cl.
CPC ......... *B01D 69/1214* (2022.08); *B01D 69/02* (2013.01); *B01D 69/081* (2013.01);
(Continued)

(58) Field of Classification Search
CPC ...................... B01D 69/081; B01D 2325/023
See application file for complete search history.

(56) References Cited

U.S. PATENT DOCUMENTS 4,585,711 A * 4/1986 Vaidyanathan ......... H01M 4/86
429/522
8,303,690 B2   11/2012 Yoshimune et al.
(Continued)

FOREIGN PATENT DOCUMENTS

CN    104069741 A  * 10/2014
CN    104307388 A    1/2015
(Continued)

OTHER PUBLICATIONS

International Search Report and Written Opinion for International Application No. PCT/JP2019/021260, dated Jul. 30, 2019, 6 pages.
(Continued)

*Primary Examiner* — Claire A Norris
(74) *Attorney, Agent, or Firm* — Buchanan Ingersoll & Rooney PC (57) ABSTRACT

Stable maintenance of high separation performance of a separation membrane having a separation layer comprising a compact carbon layer is described in addition to a separation membrane having a separation layer comprising a compact carbon layer, wherein particles are attached to the compact carbon layer, recesses are present in the compact carbon layer, and the particles are at least partially stuck in the recesses.

13 Claims, 4 Drawing Sheets

(51) Int. Cl.
*B01D 69/08* (2006.01)
*B01D 71/02* (2006.01)

(52) U.S. Cl.
CPC ........ *B01D 71/0211* (2022.08); *B01D 71/024* (2013.01); *B01D 2325/023* (2013.01)

(56) References Cited

U.S. PATENT DOCUMENTS

| | | | |
|---|---|---|---|
| 2003/0131731 A1* | 7/2003 | Koros | B01D 71/82 96/10 |
| 2006/0260466 A1* | 11/2006 | Tanaka | B01D 71/02231 95/11 |
| 2011/0168624 A1* | 7/2011 | Wang | B01D 71/021 210/497.1 |
| 2014/0144322 A1 | 5/2014 | Hwang et al. | |
| 2017/0320020 A1* | 11/2017 | Watanabe | B01D 69/141 |
| 2017/0358540 A1* | 12/2017 | Min | H01L 23/552 |
| 2019/0022599 A1 | 1/2019 | Takeuchi et al. | |

FOREIGN PATENT DOCUMENTS

| | | |
|---|---|---|
| CN | 106310956 A | 1/2017 |
| JP | 0810594 A | 1/1996 |
| JP | 2009034614 A | 2/2009 |
| JP | 2013071073 A | 4/2013 |
| JP | 2014527460 A | 10/2014 |
| JP | 2017131881 A | 8/2017 |
| JP | 2017131882 A | 8/2017 |
| JP | 2018158304 A | 10/2018 |
| WO | 2017126501 A1 | 7/2017 |

OTHER PUBLICATIONS

Chinese Office Action with Search Report for Chinese Application No. 201980035586.6, dated Jan. 22, 2022, with translation, 12 pages.

* cited by examiner

SEPARATION MEMBRANE

CROSS REFERENCE TO RELATED APPLICATIONS

This is the U.S. National Phase application of PCT/JP2019/021260, filed May 29, 2019, which claims priority to Japanese Patent Application No. 2018-107417, filed Jun. 5, 2018, the disclosures of these applications being incorporated herein by reference in their entireties for all purposes.

FIELD OF THE INVENTION

The present invention relates to a separation membrane used for separating substances.

BACKGROUND OF THE INVENTION

A membrane separation method is used as a means for selectively separating a specific component from various mixed gases and mixed liquids for purification. The membrane separation method attracts attention because the method is an energy-saving means as compared with other fluid separation methods.

For example, in a natural gas purification plant, carbon dioxide, which is an impurity contained in a methane gas as the main component, has to be separated and removed. From the viewpoint of efficient use of the energy, it is required to separate carbon dioxide for purification of the methane gas at a high gas pressure of several megapascals or more, because the higher the pressure difference between the upstream side and the downstream side of the separation membrane is, the higher the permeation rate is.

Moreover, in the chemical industry, the membrane separation method has begun to be used in the process of separating water as an impurity contained in alcohols and acetic acid for purification, and it has been required to perform the separation and purification at a high pressure for increasing the permeation flow rate of the substance to be separated.

In particular, a separation layer containing carbon has a molecular sieve effect of separating the target substance by the molecular size, and also has an advantage of high heat resistance and high durability. Therefore, various separation membranes having a separation layer including a dense carbon layer have been proposed (for example, Patent Documents 1 and 2).

PATENT DOCUMENTS

Patent Document 1: Japanese Patent Laid-open Publication No. 2009-034614
Patent Document 2: Japanese Patent Laid-open Publication No. 2013-071073

SUMMARY OF THE INVENTION

The separation membrane having a separation layer including a dense carbon layer as described in Patent Document 1 or 2, however, has a problem of defects such as pinholes and cracks formed by the influence of foreign matters derived from the production process as well as stress due to expansion, contraction or the like. Furthermore, when the membranes are continuously used, vibrations of the membranes due to fluctuation of the gas pressure or the like may newly cause defects such as cracks due to contact between the membranes, and such problem has been remarkably observed in hard carbon membranes. When the defects generated in the carbon membrane in this manner are larger than the gas molecules to be separated, the gas to be separated leaks through the defects without being separated, and it is difficult to obtain sufficient gas separation performance.

The present invention intended for solving the above-mentioned problems is a separation membrane having a separation layer including a dense carbon layer, wherein particles adhere to a surface of the dense carbon layer, a dense layer carbon layer has a recess, and at least part of the particles are embedded in the recess.

According to the present invention, a separation membrane having a separation layer including a dense carbon layer can stably maintain high separation performance.

DETAILED DESCRIPTION OF EMBODIMENTS OF THE INVENTION

Hereinafter, the wording "to" in a numerical range represents that the range includes numerical values at both ends thereof.

<Separation Membrane>

The separation membrane of the present invention is a separation membrane having a separation layer including a dense carbon layer, that is, a separation membrane in which the dense carbon layer functions as a separation layer for a substance to be separated.

In the present invention, the dense carbon layer is a layer having a carbon component rate of 50% by weight or more. The carbon component rate in the dense carbon layer is preferably 60 to 95% by weight. When the carbon component rate is 60% by weight or more, the carbon membrane tends to have improved heat resistance and chemical resistance. The carbon component rate in the dense carbon layer is more preferably 65% by weight or more. In addition, when the carbon component rate in the dense carbon layer is 50% by weight to 95% by weight, the dense carbon layer exhibits flexibility and has improved handleability. The carbon component rate in the dense carbon layer is more preferably 50% by weight to 85% by weight.

Herein, the carbon component rate is the weight fraction of the carbon component based on 100% in total of carbon, hydrogen, and nitrogen components measured by an organic elemental analysis method. It is to be noted that in the separation membrane, when the dense carbon layer and other layers described later, such as a core layer, each contain carbon as a main component, and the layers do not have a clear boundary therebetween and are judged as being uniformly formed, the carbon component rate may be a quantified value of the whole separation membrane. The dense carbon layer is a layer having substantially no pores. Specifically, in an observation of the surface of the dense carbon layer with a scanning electron microscope at a magnification of 1±0.1 (nm/pixel), when there is a portion having an area of 500 nm² or more and having no clearly observed pores, it is judged that the dense carbon layer has substantially no pores. It is to be noted that defects or the like blocked by particles described later are not regarded as pores.

The thickness, that is, the film thickness of the dense carbon layer is not particularly limited, and can be appropriately determined according to the intended use and the like. In general, the smaller the film thickness is, the higher the permeation rate of a fluid is. Therefore, the film thickness is preferably 10 μm or less, more preferably 5 μm or less, and still more preferably 1 μm or less. Meanwhile, the larger the film thickness is, the more reliably the fluid leakage is suppressed and the separation function is improved. Therefore, the film thickness is preferably 1 nm or more, and more preferably 10 nm or more. Herein, the film thickness of the dense carbon layer refers to, in an observation of a cross section of the carbon membrane (when the carbon membrane is fibrous, a cross section perpendicular to the fiber axis, and when the carbon membrane is film-like, a cross section in the thickness direction) with a scanning electron microscope, the length of a line segment $A_1A_2$, which is obtained by connecting a point—$A_1$ randomly selected from an interface of the dense carbon layer to which the particles adhere with a point $A_2$ that is on the other surface of the dense carbon layer and is determined so that the distance from the point $A_1$ to the point $A_2$ may be the shortest. In this process, if the point $A_1$ corresponds to a recess, the point $A_1$ is randomly selected again.

The dense carbon layer has recesses, and the recesses can be recognized by observing a cross section of the dense carbon layer (when the separation membrane is fibrous, a cross section perpendicular to the fiber axis, and when the separation membrane is film-like, a cross section in the thickness direction) with a scanning electron microscope. Specifically, in an observation of the surface of the separation membrane to which particles adhere with a scanning electron microscope, a cross section perpendicular to the fiber axis direction is formed by a cross section polisher method (CP method) at a portion where the dense carbon layer is recessed or a portion where the adhered particles are concentrated, and the cross section is observed with the scanning electron microscope.

The definition of the recesses will be described with reference to FIGS. 3, 4, and 5.

Figure 3:
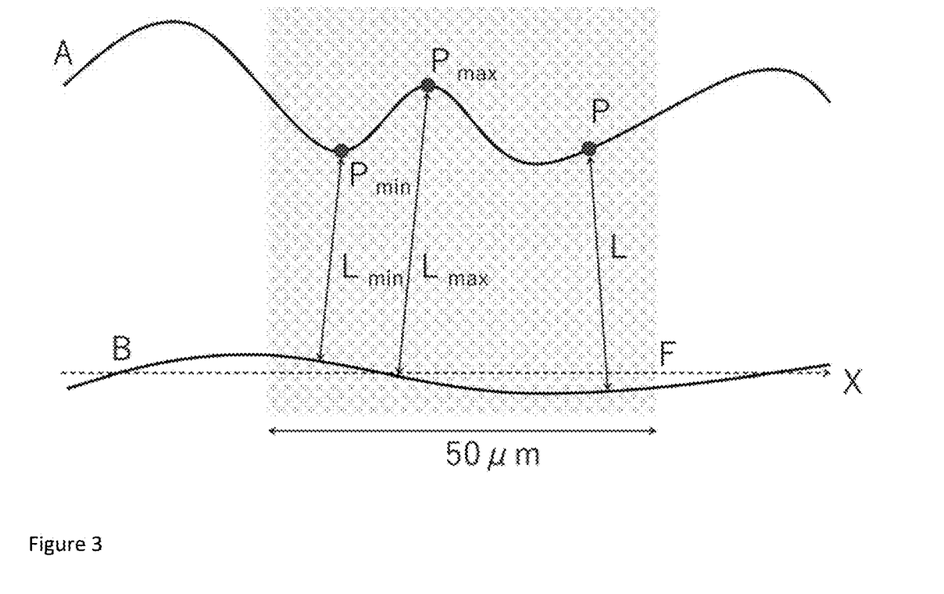
FIG. 3 is a diagram illustrating a method for defining a recess.

In FIG. 3, interfaces of the dense carbon layer are photographed so that both the interfaces formed by the dense carbon layer and a layer other than the dense carbon layer may come within a visual field of 50 μm or more. As for an interface B reverse to an interface A to which the particles adhere, a straight line is fitted by a least-squares method. A fitted straight line F is defined as the X-axis. A point on the interface A to which the particles adhere is defined as a point P, and the shortest distance from the point P to the other interface is defined as a distance L. The minimum value of the distance L is defined as $L_{min}$, a point on the interface A at which the distance L assumes the minimum value is defined as $P_{min}$, the maximum value of the distance L is defined as $L_{max}$, and a point on the interface A at which the distance L assumes the maximum value is defined as $P_{max}$.

In the following description, the right side and the left side refer to the positions based on the assumption that the separation membrane is disposed so that the interface A of the dense carbon layer to which particles adhere may be the upper side and the interface B may be the lower side in the visual field to be observed.

Figure 4:
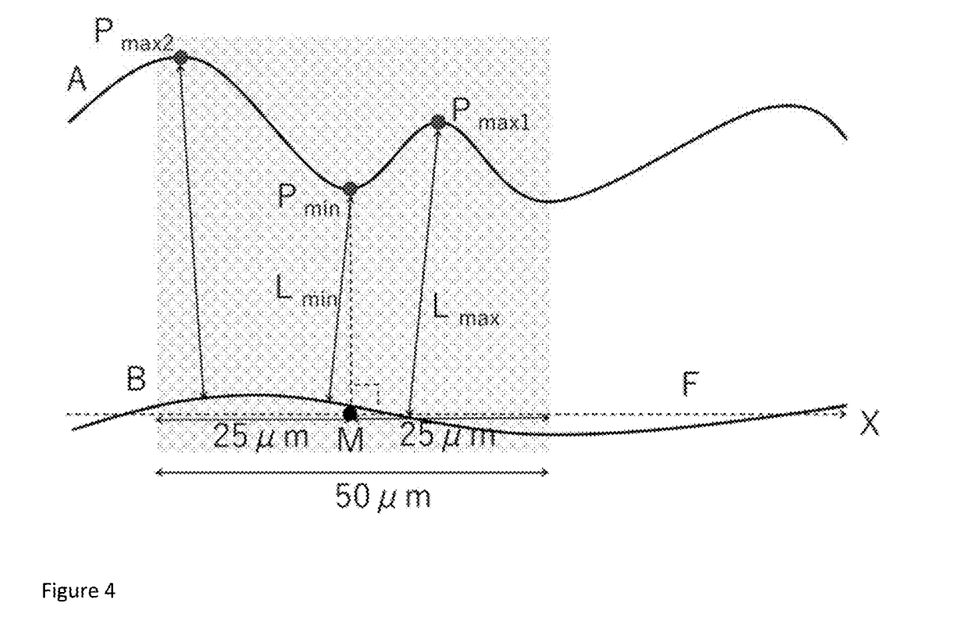
FIG. 4 is a diagram illustrating a method for defining a recess.

Then, in FIG. 4, one of the minimum values of the distance L determined as described above is defined as the value $L_{min}$, and a point on the interface A at which the distance L assumes the minimum value is defined as the point $P_{min}$. Then, a perpendicular is drawn from the point $P_{min}$ to the X-axis, and with an intersection point M of the drawn perpendicular and the X-axis regarded as the midpoint, a range of 50 μm on the X-axis is determined again. When there are a plurality of points $P_{max}$ at which the distance L assumes the maximum value, the maximum value of the distance L at the point $P_{max}$ closest to the point $P_{min}$ is defined as the value $L_{max}$. In FIG. 4, the maximum value of the distance L at a point $P_{max1}$ is the value $L_{max}$. When the value of $L_{max}-L_{min}$ is 0.3 $L_{max}$ or more, the position is regarded as a recess. The value of $L_{max}-L_{min}$ is preferably 0.6 $L_{max}$ or more, and more preferably $L_{max}$. When the separation membrane has at least one site where the value of $L_{max}-L_{min}$ is 0.3 $L_{max}$ or more, it is assumed that the dense carbon layer has a recess.

Figure 5:
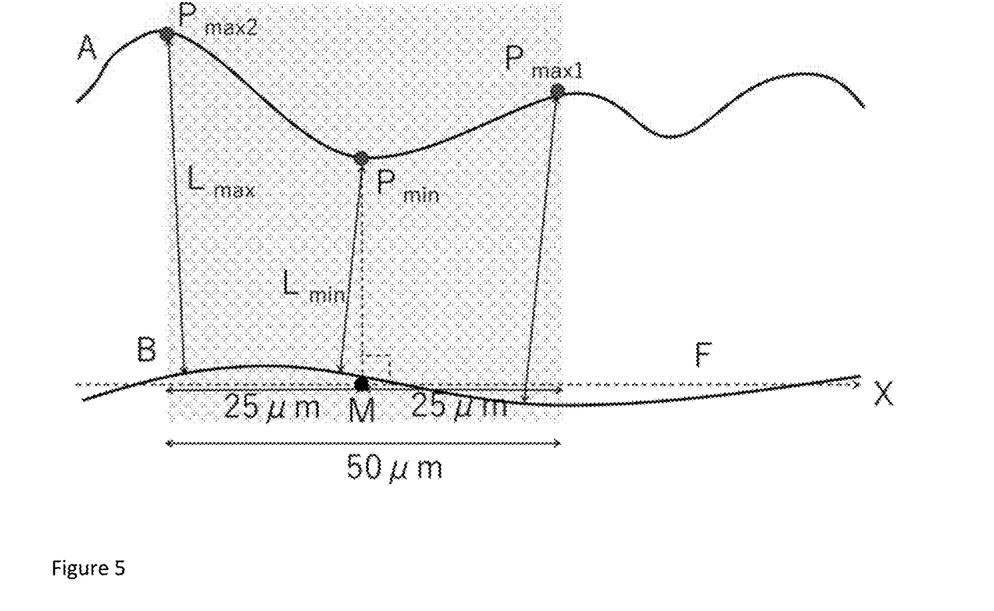
FIG. 5 is a diagram illustrating a method for defining a recess.

Furthermore, as shown in FIG. 5, when there is no maximum value in the range of 50 μm on the X-axis, the larger value of the distances L at points $P_{max1}$ and $P_{max2}$ at both ends of the range of 50 μm is defined as the value $L_{max}$. In FIG. 5, the maximum value of the distance L at the point $P_{max2}$ the value $L_{max}$. In the range of 50 μm on the X-axis, for example, when there is a maximum value only on the right side, the larger value of the maximum value on the right side and the distance L at the leftmost point P is defined as the value $L_{max}$.

When the value of $L_{max}-L_{min}$ is $L_{max}$, $L_{min}$ is 0, that is, the dense carbon layer is penetrated. As described above, even if the dense carbon layer is penetrated, the through hole does not correspond to the pore in the definition of the dense carbon layer as long as the through hole is blocked by particles.

The shape of the recess is not particularly limited, but may be, for example, circular, elliptical, linear, curved, or branched curved. The shape of the recess can be recognized by removing the adhered particles through pressure spraying, washing with water or the like, and then observing the dense carbon layer with a scanning electron microscope from a direction perpendicular to the surface of the dense carbon layer.

The size of the recess is preferably 20 μm or less, more preferably 10 μm or less, and still more preferably 5 μm or less from the viewpoint of ease of blocking with the particles. The size of the recess is measured by cross-sectional observation of the recess.

Figure 6:
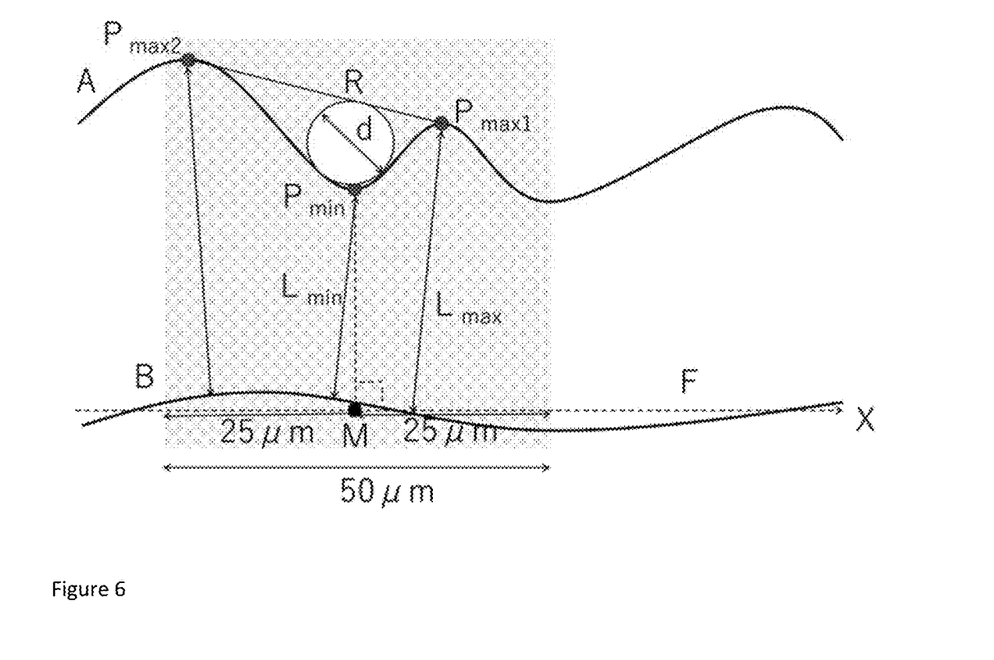
FIG. 6 is a diagram illustrating a method for measuring the recess size.

A method for measuring the recess size will be described with reference to FIG. 6. In the right and left regions divided by the point $P_{min}$ as a boundary, among the points $P_{max}$ at which each of the distances L assumes the maximum value, points $P_{max}$ each closest to the point $P_{min}$ in the right and left regions are defined as points $P_{max1}$ and $P_{max2}$, respectively. In a largest inscribed circle R of the region surrounded by a line segment $P_{max1}P_{max2}$ and the interface A, a diameter d is defined as the recess size.

When there is no maximum value in the range of 50 μm on the X-axis, points P at both ends of the range of 50 μm are defined as the points $P_{max1}$ and $P_{max2}$. In the range of 50 μm on the X-axis, for example, when there is a maximum value only on the right side, the point $P_{max}$ at which the distance L assumes the maximum value on the right side is defined as the point $P_{max1}$, and the leftmost point P is defined as the point $P_{max2}$.

When the above-mentioned recess satisfies $L_{max} - L_{min} = L_{max}$, that is, when $L_{min}$ is 0 and the dense carbon layer is penetrated, the range of x in which $L_{min}$ is 0 is defined as the recess size.

Figure 7:
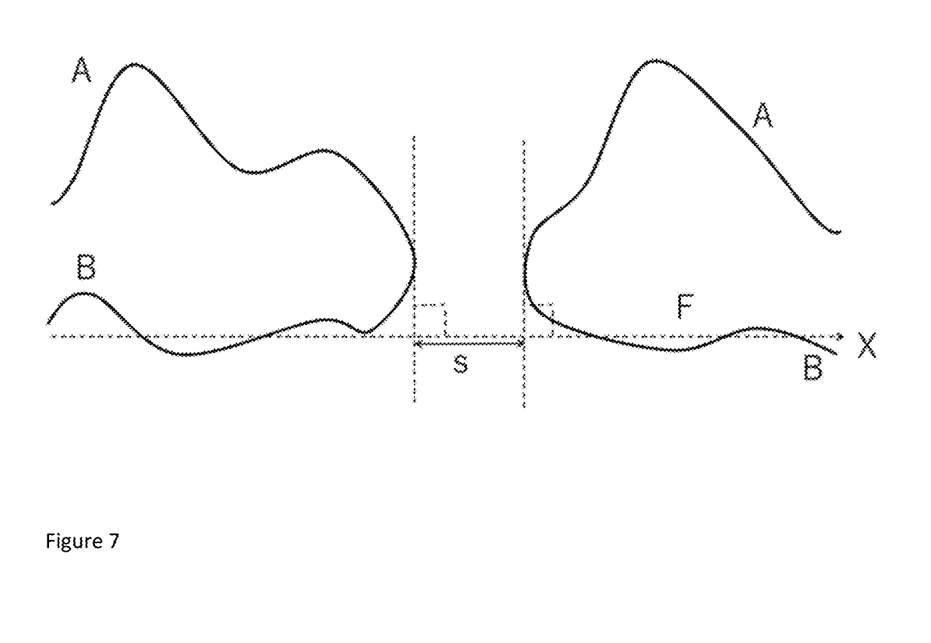
FIG. 7 is a diagram illustrating a method for measuring the size of a recess penetrating the dense carbon layer.

A method for measuring the size of a recess penetrating the dense carbon layer will be described with reference to FIG. 7. A range s of x, in which there is at most one point of intersection between a perpendicular to the fitted straight line F and the interface of the dense carbon layer, is defined as the size of a recess penetrating the dense carbon layer.

From the viewpoint of pressure resistance and strength, a form in which the separation membrane has the dense carbon layer formed on a surface of a core layer having a porous structure can be mentioned.

The material of the core layer is not particularly limited, and may be carbon, ceramic, stainless steel, glass, a polymer or the like. From the viewpoint of pressure resistance, chemical resistance, and strength, carbon or ceramic is preferable. It is preferable that the material of the core layer contain carbon as a main component similarly to the dense carbon layer because the material same as that of the dense carbon layer increases the adhesiveness between the plurality of layers and suppresses the delamination.

The porous structure is a structure in which, in the observation of the cross section of the core layer with a scanning electron microscope, a plurality of voids coexist in the component forming the core layer. Examples of the porous structure include a sea-island structure composed of a sea part made from a component forming the core and an island part forming the voids, and a co-continuous porous structure described below.

The core layer preferably has a co-continuous porous structure. The co-continuous porous structure is a structure including branches and voids that are separately three-dimensionally continuous, and is a structure recognized by the surface observation, with a scanning electron microscope, of a cross section obtained by cutting a sample sufficiently cooled in liquid nitrogen with tweezers or the like. The co-continuous porous structure produces an effect that the branches support one another to maintain the entire structure, so that the stress is distributed throughout the structure. Therefore, the structure has high resistance to external forces such as compression and bending, and can increase the compressive strength and the compressive specific strength. Furthermore, since the voids are three-dimensionally linked with one another, the voids serve as a flow path for supplying or discharging fluids such as gases and liquids.

Furthermore, in the co-continuous porous structure, it is particularly preferable that the branches and the voids are regularly entangled with each other to have a structural period, and it is still more preferable that the structural period be 10 nm to 10 μm. The fact that the co-continuous porous structure has a structural period means that the co-continuous porous structure has high uniformity, that is, the thickness of the branches and the size of the voids are uniform. In such an aspect, high compressive strength is easily obtained. When the structural period is 10 μm or less, the branches and the voids have a fine structure to increase the compressive strength. The structural period is more preferably 5 μm or less, and still more preferably 3 μm or less. Meanwhile, when the structural period is 10 nm or more, the pressure loss during passage of a fluid through the voids is reduced, the permeation rate of the fluid is improved, and the fluid can be separated with less energy. The structural period is more preferably 100 nm or more, and still more preferably 300 nm or more.

The structural period of the co-continuous porous structure is calculated from a scattering angle 2θ by the following formula, wherein the scattering angle 2θ corresponds to the position of a peak top of scattering intensity that is obtained by irradiating the co-continuous porous structure with X-rays, and performing small-angle scattering.

$$L = \frac{\lambda}{2\sin\theta} \quad [\text{Math. 1}]$$

L: structural period, λ: wavelength of incident X-rays

However, the small-angle scattering sometimes cannot be observed because of a large structural period. In such a case, the structural period is obtained by X-ray computed tomography (X-ray CT). Specifically, a three-dimensional image captured by X-ray CT is subjected to Fourier transform to produce a two-dimensional spectrum, and the two-dimensional spectrum is processed by circular averaging to produce a one-dimensional spectrum. The characteristic wavelength corresponding to the position of a peak top in the one-dimensional spectrum is determined, and the structural period is calculated as the inverse of the wavelength.

Furthermore, the more uniform the co-continuous porous structure is, the more effectively the stress is distributed throughout the structure, and the higher the compressive strength is. The uniformity of the co-continuous porous structure can be determined by the half-value width of a peak of scattering intensity of X-rays. Specifically, the core layer is irradiated with X-rays, and the smaller the half-value width of the obtained peak of scattering intensity is, it is judged that the higher the uniformity is. The half-value width of the peak is preferably 5° or less, more preferably 1° or less, and still more preferably 0.1° or less. The wording "half-value width of a peak" in the present invention means the width determined in the following manner. Specifically, the vertex of the peak is named point A, and a straight line parallel to the ordinate of the graph is drawn from point A. The intersection point of the straight line and the baseline of the spectrum is named point B, and the width of the peak as measured at the midpoint C of the line segment connecting points A and B is defined as the half-value width. The wording "width of the peak" herein means the length between the intersection points of the scattering curve and the straight line that is parallel to the baseline and passes through point C.

The pores that form the voids of the core layer preferably have an average diameter of 30 nm or more because the pressure loss is reduced and the fluid permeability is improved, and the average diameter is more preferably 100 nm or more. Meanwhile, the average diameter is preferably 5 μm or less because the effect exerted by portions other than the pores to support one another for maintaining the entire core layer is improved to increase the compressive strength, and the average diameter is more preferably 2.5 μm or less. Herein, the average diameter of the pores forming the voids of the core layer is a value measured by measuring the pore size distribution of the separation membrane by the mercury intrusion method. In the mercury intrusion method, a pressure is applied to the pores in the core layer so that mercury may infiltrate into the pores, and the pore volume and the specific surface area of the pores are determined from the pressure and the amount of the mercury intruded in the pores. Then, the pore diameter is calculated from the relationship between the pore volume and the specific surface area of the pores based on the assumption that the pores are cylindrical. The mercury intrusion method can provide a pore diameter distribution curve of 5 nm to 500 μm. Since the dense carbon layer has substantially no pores, the average diameter of the pores measured using the entire separation membrane as a sample can be regarded as substantially the same as the average diameter of the pores in the core layer.

The shape of the separation membrane of the present invention is not particularly limited, and the separation membrane may have a fibrous shape or a film-like shape. From the viewpoint of high filling efficiency and high separation efficiency per volume in a module as well as excellent handleability, a fibrous shape is more preferable. Herein, an object having a "fibrous shape" refers to an object having a ratio of the length L to the diameter D (aspect ratio L/D) of 100 or more. In the following, the separation membrane having a fibrous shape will be described.

The shape of the fiber cross section is not limited, and the fiber cross section may have any shape as in a hollow cross section, a round cross section, a polygonal cross section, a multi-lobe cross section, and a flat cross section. The fiber cross section is preferably a hollow cross section, in other words, it is preferable that the fiber have a hollow fiber shape because such a cross section reduces the pressure loss in the membrane to provide the separation membrane with high fluid permeability. A hollow portion in a hollow fiber serves as a fluid flow path. The hollow fiber having a hollow portion produces an effect of significantly reducing the pressure loss particularly when a fluid flows in the fiber axis direction in both cases of an external pressure system and an internal pressure system for the fluid permeation, and improves the fluid permeability. The pressure loss is reduced particularly in the case of an internal pressure system, so that the permeation rate of a fluid is further improved.

Furthermore, when the fibrous separation membrane has a small average diameter, the bendability and the compressive strength are improved. Therefore, the average diameter is preferably 500 μm or less, more preferably 400 μm or less, and still more preferably 300 μm or less. The smaller the average diameter of the separation membrane is, the larger the number of fibers that can be filled per unit volume is, so that the membrane area per unit volume can be increased, and the permeation flow rate per unit volume can be increased. The lower limit of the average diameter of the separation membrane is not particularly limited, and can be arbitrarily determined. From the viewpoint of improving the handleability during the production of a separation membrane module, the average diameter is preferably 10 μm or more, and more preferably 100 μm or more.

The average diameter of the fibrous separation membrane is calculated by the following method. A cross section perpendicular to the fiber axis direction is formed by a cross section polisher method (CP method), and the cross section is photographed from directly above with a scanning electron microscope. The cross-sectional area of the fiber is obtained from the photographed cross-sectional image, and the diameter of a circle having the same area as the obtained cross-sectional area is taken as the diameter of the fiber. This operation is carried out at 5 randomly selected sites of the fibers, and the arithmetic mean value of the diameters of the fibers obtained at the sites is taken as the average diameter of the fibers. When the fiber has a hollow fiber shape, the cross-sectional area of the fiber including the cross-sectional area of the hollow portion is calculated.

[Particles]

In the separation membrane of the present invention, particles adhere to a surface of the dense carbon layer, a dense layer carbon layer has a recess, and at least part of the particles are embedded in the recess. (Hereinafter, such particles are sometimes referred to as "adhered particles".) This configuration makes it possible to maintain a satisfactory separation factor even when the dense carbon layer has defects.

Furthermore, use of the particles has an effect that, even if new defects are formed in the dense carbon layer during the use of the separation membrane, the particles adhered to the periphery of the defects can move to block the defects so that a decrease in the separation factor can be suppressed. Furthermore, even though a single particle is rigid as sand, particles as an aggregate can deform. Therefore, it is possible to expect an effect that owing to the contact between the separation membranes with the particles interposed therebetween, the particles absorb the impact to reduce the damage to the separation membranes, so that the formation of new defects is suppressed.

Figure 1:
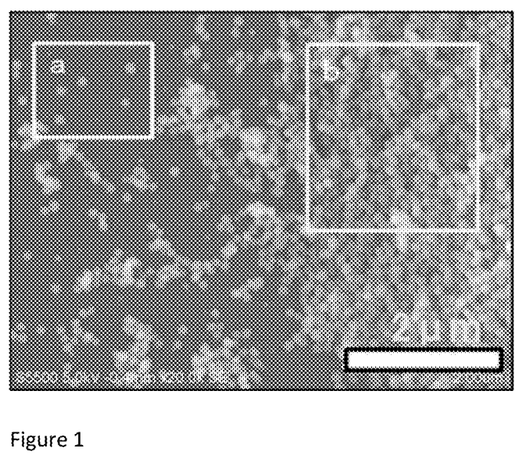
FIG. 1 is a scanning electron micrograph of a surface of a separation membrane produced in Example 1.
Figure 2:
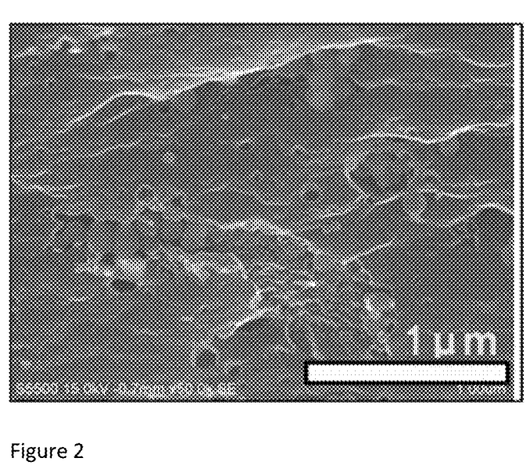
FIG. 2 is a scanning electron micrograph showing a state in which particles are embedded in recesses in the surface of the separation membrane produced in Example 1.

Herein, the wording "particles adhere to a surface of the dense carbon layer" means that part of the dense carbon layer is occupied by the particles as observed with a scanning electron microscope. Examples of the mode of adhesion include, in addition to a state in which particles are in direct contact with the dense carbon layer (part a in FIG. 1) and a state in which particles are further deposited on the particles in contact with the dense carbon layer (part b in FIG. 1), a state in which particles are embedded in the recesses (defects) present in the dense carbon layer (FIG. 2).

In the present invention, at least part of the above-mentioned adhered particles are embedded in the defects and block the defects, whereby a defect repairing effect is expressed. The wording "particles are embedded in the recesses" means, as shown in FIG. 2, in the observation of the particles with a scanning electron microscope, a state in which part of the adhered particles are covered with the dense carbon layer and found below the outermost surface of the dense carbon layer, or in the cross-sectional observation of the recesses, a state in which part or all of the particles are within a region surrounded by the recess and a line connecting two points selected by the same method as that in the determination of the recess size.

The occupancy of the surface of the dense carbon layer by the adhered particles is preferably 0.01% or more, more preferably 0.1% or more, and still more preferably 1% or more from the viewpoint of effectively expressing the above-mentioned function of the particles. Furthermore, the occupancy is preferably 90% or less, more preferably 75% or less, and still more preferably 50% or less from the viewpoint of preventing the particles from falling off during use. The occupancy of the surface of the dense carbon layer by the adhered particles is calculated by observing the surface of the separation membrane from directly above with a scanning electron microscope at a magnification of 1±0.1 (nm/pixel) at 700,000 pixels or more, setting a target region of 512 pixels square required for calculation in the obtained image, calculating the occupancy by the following formula with the area of the target region being $C_m$ and the area of the adhered particles being $C_p$, and calculating the occupancy by the arithmetic mean value of 20 randomly selected sites in the surface of the dense carbon layer. When the dense carbon layer with adhered particles is not exposed on the surface of the separation membrane, such as when the dense carbon layer is present on an inner surface of a hollow fiber, the dense carbon layer is exposed by ion milling, and a portion with little damage is observed for calculation of the occupancy.

$$\text{Occupancy (\%)} = C_p/C_m \times 100$$

The particles used may be inorganic particles, organic particles, composite particles that are a combination of inorganic and organic particles, or the like, and the particles can be arbitrarily selected according to the environment in which the separation membrane is used. For example, when heat resistance and chemical resistance are required, inorganic particles used may preferably be carbon particles such as those of carbon black, graphite, and graphene, metal particles such as those of Au, Ag, Cu, Pd, Pt, and Sn, or metal oxide particles such as those of $Al_2O_3$, $TiO_2$, $Bi_2O_3$, $CeO_2$, CoO, CuO, $Ho_2O_3$, ITO, MgO, $SiO_2$, $SnO_2$, $Y_2O_3$, and ZnO, and organic particles used may preferably be those of polyphenylene sulfide or a polyimide. Furthermore, when an impact absorbing effect is emphasized, it is preferable to use organic particles such as those of polystyrene, polyamideimide, polyvinylidene fluoride, epoxy, polylactic acid, and an elastomer.

Such particles may be subjected to a pretreatment for controlling the affinity with a specific substance. Examples of the pretreatment include, besides a hydrophilic treatment, a water repellent treatment and the like, modification for suppressing adsorption of foulants, which is performed when the separation membrane is used as a water treatment membrane, and a treatment for facilitating permeation of gas components to permeate and a treatment for preventing permeation of gas components to be separated, which are performed when the separation membrane is used as a gas separation membrane.

The shape of the particles is not particularly limited, and any shape such as a spherical shape, a cube shape, or a flaky shape can be selected. A spherical shape is preferable because spherical particles have a high impact absorbing effect, and easily move to block the newly formed defects and can maintain high separability.

The wording "spherical particles" refers to particles having a ratio $S_2/S_1$ of 0.70 or more and a ratio $L_2/L_1$ of 0.70 or more, wherein $S_2/S_1$ is the ratio between an area $S_1$ of a circumscribed ellipse of a particle observed with a scanning electron microscope, and an area $S_2$ of the particle, and $L_2/L_1$ is the ratio between a length $L_1$ of a long axis of the circumscribed ellipse, and a length $L_2$ of a short axis of the circumscribed ellipse.

The particle size of the particles is preferably 5 nm or more from the viewpoint of efficiently repairing the defects. From the viewpoint of enhancing the impact absorbing effect, the particle size of the particles is preferably 10 μm or less, and more preferably 5 μm or less.

Furthermore, from the viewpoint of more effectively blocking the recesses and enhancing the effect of repairing the defects, it is preferable to adhere two or more types of particles having different diameters. Adhesion of two or more types of particles refers to a state in which two or more peaks appear on a particle size distribution curve obtained using a particle size distribution meter described below.

The particle size of the particles in the present invention is a value measured by the following method. First, air is blown to a surface of the separation membrane to which the particles adhere at a jet pressure of 0.2 MPa or more to make the particles fall off the separation membrane for collection. If the particles adhere to the inner surface of a hollow fiber, the hollow fiber is cut into a 5-cm piece, and air is injected at 0.2 MPa or more from one end surface of the piece into the hollow portion to make the particles fall off, while the particles are collected from the hollow portion at the other end surface. The collected particles are dispersed in water, and then treated with an ultrasonic homogenizer at 20 kHz for 30 minutes. The particle size distribution is measured with a particle size distribution meter (LA-920 manufactured by HORIBA, Ltd.), and the peak value of the obtained particle size distribution curve, that is, the mode value is defined as the particle size. If there are two or more peaks, the value of each peak is defined as the particle size of the adhered particles.

When the separation membrane is fibrous, from the viewpoint of preventing the particles from falling off, the particle size is preferably 1/30 or less, more preferably 1/50 or less, still more preferably 1/100 or less, and particularly preferably 1/1000 or less of the average diameter of the separation membrane.

<Method for Producing Separation Membrane>

The separation membrane of the present invention can be produced, for example, by a production method including a step of preparing a separation membrane having a separation layer including a dense carbon layer, and a step of adhering particles to the separation membrane. Herein, the membrane before the adhesion of particles may sometimes be referred to as a "separation membrane" for convenience of description.

1. Step of Preparing Separation Membrane Including Dense Carbon Layer

The separation membrane before the adhesion of particles may be a commercially available membrane, but the membrane can be produced by the following steps 1 to 3, for example. This example is an example of a separation membrane having, as a core layer, a layer having a porous structure and containing carbon as a main component. In the following description, the core layer containing carbon is referred to as a "porous carbon core". However, in the present invention, the method for producing a separation membrane is not limited to the method described below.

[Step 1]

Step 1 is a step of carbonizing a molded article containing a resin serving as a porous carbon core precursor (hereinafter, the resin is sometimes referred to as a "core precursor resin") at 500° C. or more and 2,400° C. or less to produce a porous carbon core.

The core precursor resin used may be a thermoplastic resin or a thermosetting resin. Examples of the thermoplastic resin include polyphenylene ether, polyvinyl alcohol, polyacrylonitrile, phenol resins, aromatic polyesters, polyamic acids, aromatic polyimides, aromatic polyamides, polyvinylidene fluoride, cellulose acetate, polyetherimide, and copolymers of these resins. Examples of the thermosetting resin include unsaturated polyester resins, alkyd resins, melamine resins, urea resins, polyimide resins, diallyl phthalate resins, lignin resins, urethane resins, phenol resins, polyfurfuryl alcohol resins, and copolymers of these resins. These resins may be used alone, or a plurality of the resins may be used.

The core precursor resin used is preferably a thermoplastic resin capable of solution spinning. From the viewpoint of cost and productivity, polyacrylonitrile or an aromatic polyimide is particularly preferably used.

It is preferable to add, to the molded article containing the core precursor resin, a disappearing component that can disappear after molding in addition to the core precursor resin. For example, dispersing particles that disappear by post heating in the carbonization, washing after the carbonization, or the like makes it possible to form a porous structure as well as control the average diameter of the pores forming the voids in the porous structure.

As an example of a means for finally obtaining the porous structure, first, an example in which a resin that disappears after the carbonization (disappearing resin) is added will be described. First, the core precursor resin is mixed with the disappearing resin to produce a resin mixture. The mixing ratio is preferably 10 to 90% by weight of the disappearing resin based on 10 to 90% by weight of the core precursor resin. Herein, the disappearing resin is preferably selected from resins that are compatible with the core precursor resin. The method of compatibilizing the resins may be mixing of only the resins or addition of a solvent. Such a combination of the core precursor resin and the disappearing resin is not limited, and examples thereof include polyacrylonitrile/polyvinyl alcohol, polyacrylonitrile/polyvinyl phenol, polyacrylonitrile/polyvinylpyrrolidone, and polyacrylonitrile/polylactic acid. The obtained compatibilized resin mixture is preferably subjected to phase separation during the molding process. Such an operation can produce a co-continuous phase-separated structure. The method for phase separation is not limited, and examples thereof include a thermally induced phase separation method and a non-solvent-induced phase separation method.

Examples of the means for finally obtaining the porous structure further include a method of adding particles that disappear by post heating in the carbonization or washing after the carbonization. Examples of the particles include those of metal oxides and talc, and examples of the metal oxides include silica, magnesium oxide, aluminum oxide, and zinc oxide. These particles are preferably mixed with the core precursor resin before the molding and removed after the molding. The method for removing the particles can be appropriately selected according to the production conditions and the properties of the particles used. For example, the particles may be thermally decomposed and removed simultaneously with the carbonization of the core precursor resin, or may be washed away before or after the carbonization. The washing liquid can be appropriately selected from water, an alkaline aqueous solution, an acidic aqueous solution, an organic solvent, and the like according to the properties of the particles used.

In the following, as for the case where the method of mixing the core precursor resin with the disappearing resin to produce a resin mixture is employed as the means for finally obtaining the porous structure, the subsequent production process will be described.

When a fibrous separation membrane is produced, a porous carbon core precursor can be formed by solution spinning. The solution spinning is a method of obtaining a fiber by dissolving a resin in some solvent to produce a spinning stock solution, and passing the spinning stock solution through a bath containing a solvent that serves as a poor solvent for the resin to coagulate the resin. Examples of the solution spinning include dry spinning, dry-wet spinning, and wet spinning.

Furthermore, it is possible to form pores in the surface of the porous carbon core by appropriately controlling the spinning conditions. For example, when a fiber is spun by a non-solvent-induced phase separation method, examples of the technique of forming pores include a technique of appropriately controlling the composition and the temperature of the spinning stock solution or the coagulation bath, and a technique of discharging the spinning solution from the inner tube and simultaneously discharging, from the outer tube, a solution in which the same solvent as that of the spinning solution and the disappearing resin are dissolved.

The fiber spun by the above-mentioned method can be coagulated in the coagulation bath, followed by washing with water and drying to produce a porous carbon core precursor. Examples of the coagulating liquid include water, ethanol, saline, and a mixed solvent containing any of these liquids and the solvent used in step 1. It is also possible to dip the fiber in a coagulation bath or a water bath before the drying step to elute the solvent or the disappearing resin.

The porous carbon core precursor may be subjected to an infusibilization treatment before the carbonization treatment. The method of the infusibilization treatment is not limited, and a publicly known method can be employed.

The porous carbon core precursor subjected to the infusibilization treatment as necessary is finally carbonized into a porous carbon core. The carbonization is preferably performed by heating in an inert gas atmosphere. Herein, examples of the inert gas include helium, nitrogen, and argon. The flow rate of the inert gas is required to be a flow rate at which the oxygen concentration in the heating device can be sufficiently lowered, and it is preferable to appropriately select an optimal flow rate value according to the size of the heating device, the supply amount of the raw material, the carbonization temperature, and the like. The disappearing resin may be removed by thermal decomposition with heat generated during the carbonization.

The carbonization temperature is preferably 500° C. or more and 2,400° C. or less. Herein, the carbonization temperature is the maximum attained temperature during the carbonization treatment. The carbonization temperature is more preferably 900° C. or more from the viewpoint of suppressing the dimensional change and improving the function as a support. Meanwhile, the carbonization temperature is more preferably 1,500° C. or less from the viewpoint of reducing the brittleness and improving the handleability.

[Surface Treatment of Porous Carbon Support]

Before a precursor resin layer of the dense carbon layer is formed on the porous carbon core in step 2 described later, the porous carbon core may be subjected to a surface treatment for improving the adhesiveness to the precursor resin layer. Examples of the surface treatment include an oxidation treatment and a chemical coating treatment. Examples of the oxidation treatment include chemical oxidation by nitric acid, sulfuric acid or the like, electrolytic oxidation, and vapor phase oxidation. Examples of the chemical coating treatment include application of a primer or a sizing agent to the porous carbon support.

[Step 2]

Step 2 is a step of forming, on the porous carbon core prepared in step 1, a precursor resin layer of the dense carbon layer. It is preferable to produce the porous carbon core and the dense carbon layer in separate steps because the thickness of the dense carbon layer can be arbitrarily determined. Therefore, for example, it is possible to reduce the thickness of the dense carbon layer to improve the permeation rate of a fluid, and the structure of the separation membrane can be easily designed.

For the precursor resin of the dense carbon layer, various resins exhibiting fluid separability after the carbonization can be employed. Specific examples of the precursor resin include polyacrylonitrile, aromatic polyimides, polybenzoxazole, aromatic polyamides, polyphenylene ether, phenol resins, cellulose acetate, polyfurfuryl alcohol, polyvinylidene fluoride, lignin, wood tar, and polymers of intrinsic microporosity (PIMs). The resin layer is preferably made from polyacrylonitrile, an aromatic polyimide, polybenzoxazole, an aromatic polyamide, polyphenylene ether, or a polymer of intrinsic microporosity (PIM) because such a resin layer has an excellent permeation rate of a fluid and excellent fluid separability, and the resin layer is more preferably made from polyacrylonitrile or an aromatic polyimide. The precursor resin of the dense carbon layer may be the same as or different from the above-mentioned support precursor resin.

The method for forming the precursor resin layer of the dense carbon layer is not limited, and a publicly known method can be employed. A general forming method is a method of applying the precursor resin of the dense carbon layer as it is to the porous carbon core. It is possible to employ a method of applying the resin precursor to the porous carbon core, and then reacting the precursor to form the precursor resin layer, or a counter diffusion method of flowing a reactive gas or solution from the outside and inside of the porous carbon core to cause a reaction. Examples of the reaction include polymerization, cyclization, and cross-linking reactions by heating or a catalyst.

Examples of the coating method for forming the precursor resin layer include a dip coating method, a nozzle coating method, a spray method, a vapor deposition method, and a cast coating method. From the viewpoint of ease of the production method, a dip coating method or a nozzle coating method is preferable when the porous carbon core is fibrous, and a dip coating method or a cast coating method is preferable when the porous carbon core is film-like.

[Infusibilization Treatment]

The porous carbon core with the precursor resin layer of the dense carbon layer formed thereon (hereinafter referred to as a "core/carbon precursor composite") produced in step 2 may be subjected to an infusibilization treatment before the carbonization treatment (step 3). The method for the infusibilization treatment is not limited, and the treatment is performed similarly to the infusibilization treatment for the porous carbon core precursor described above.

[Step 3]

Step 3 is a step of heating the core/carbon precursor composite produced in step 2 and further subjected to the infusibilization treatment as necessary to carbonize the precursor resin of the dense carbon layer, whereby a dense carbon layer is formed.

In this step, it is preferable to heat the composite of the precursor resin of the dense carbon layer in an inert gas atmosphere. Herein, examples of the inert gas include helium, nitrogen, and argon. The flow rate of the inert gas is required to be a flow rate at which the oxygen concentration in the heating device can be sufficiently lowered, and it is preferable to appropriately select an optimal flow rate value according to the size of the heating device, the supply amount of the raw material, the carbonization temperature, and the like. Although there is no upper limit on the flow rate of the inert gas, it is preferable to appropriately set the flow rate depending on the temperature distribution or the design of the heating device from the viewpoint of economic efficiency and of reducing the temperature change in the heating device.

Moreover, it is possible to chemically etch the surface of the dense carbon layer to control the pore diameter size in the surface of the dense carbon layer by heating the core/carbon precursor composite in a mixed gas atmosphere of the above-mentioned inert gas and an active gas. Examples of the active gas include oxygen, carbon dioxide, water vapor, air, and combustion gas. The concentration of the active gas in the inert gas is preferably 0.1 ppm or more and 100 ppm or less.

The carbonization temperature in this step can be arbitrarily determined within a range in which the permeation rate and the separation factor of the separation membrane are improved, and is preferably lower than the carbonization temperature for carbonizing the porous carbon core precursor in step 1. In this case, the permeation rate of a fluid and the separation performance can be improved while the hygroscopic dimensional change rates of the porous carbon core and the separation membrane are reduced to suppress the breakage of the separation membrane in a separation module. The carbonization temperature in this step is preferably 500° C. or more, and more preferably 550° C. or more. In addition, the carbonization temperature is preferably 850° C. or less, and more preferably 800° C. or less.

Other preferable aspects and the like of carbonization are similar to those of carbonization of the porous carbon core precursor described above.

2. Step of Adhering Particles to Separation Membrane

The method for adhering the particles can be selected from spraying, coating, dipping, and filtration. Examples of the spraying include a method of spraying a slurry onto the surface of the dense carbon layer using a spray or the like, and a method of spraying a powder as it is onto the surface of the dense carbon layer. Examples of the coating include a method of applying a slurry to the surface of the dense carbon layer using a brush or the like. The dipping is a method of dipping the separation membrane in a slurry and then withdrawing the separation membrane, and can easily be applied in a continuous process. As for the filtration, of two spaces separated by a carbon membrane, a fluid containing particles, such as a slurry or an aerosol, is placed in the space on the dense carbon layer surface side, and a differential pressure is applied so that the space on the dense carbon layer surface side may have a positive pressure to filter the slurry or the aerosol with the dense carbon layer, whereby the particles adhere to the surface of the dense carbon layer. In the filtration method, since the particles preferentially adhere to defective portions having low permeation resistance, the defects can be efficiently repaired without the need for identifying the defective sites. Note that it is preferable to perform this step a plurality of times because the defects can be repaired with high efficiency. When the separation membrane has a hollow fiber shape and particles are adhered to the inner surface of the hollow fiber, it is preferable to adhere the particles by filtration.

EXAMPLES

[Evaluation Methods]
(Measurement of Occupancy by Particles)

The occupancy of the surface of the dense carbon layer by the particles was calculated by observing the surface of the dense carbon layer from directly above with a scanning electron microscope (S-5500 manufactured by Hitachi High-Tech Corporation) at a magnification of 1±0.1 (nm/pixel) at 700,000 pixels or more, setting a target region of 512 pixels square required for calculation in the obtained image, calculating the occupancy by the following formula with the area of the target region being $C_m$ and the area of the adhered particles being $C_p$, and calculating the occupancy by the arithmetic mean value of 20 randomly selected sites in the surface of the dense carbon layer.

$$\text{Adhesion rate } (\%) = C_p/C_m \times 100$$

The following matters were also recognized by the observation with the scanning electron microscope: particles adhere to a surface of the dense carbon layer, a dense layer carbon layer has a recess, and at least part of the particles are embedded in the recess.

(Measurement of Particle Size)

Air was blown to a surface of the separation membrane to which the particles adhered at a jet pressure of 0.2 MPa or more to make the particles fall off the separation membrane for collection. The collected particles were dispersed in water, and then treated with an ultrasonic homogenizer at 20 kHz for 30 minutes. The particle size distribution was measured with a particle size distribution meter (LA-920 manufactured by HORIBA, Ltd.), and the peak of the obtained particle size distribution curve was defined as the particle size.

(Measurement of Separation Factor)

First, 20 separation membranes having a length of 10 cm were bundled and housed in a stainless steel casing having an outer diameter of φ6 mm and a wall thickness of 1 mm, an end of the bundled separation membranes was fixed to the inner surface of the casing with an epoxy resin adhesive, and both the ends of the casing were sealed to produce a separation membrane module. The permeation rate through the separation membrane module was measured.

The measured gases were carbon dioxide ($CO_2$) and nitrogen ($N_2$). The pressure changes of carbon dioxide and methane at the permeation side per unit time were measured by an external pressure system at a measurement temperature of 25° C. in accordance with the pressure sensor method of JIS K7126-1 (2006). Herein, the pressure difference between the supply side and the permeation side was set to 0.11 MPa (82.5 cmHg).

Then, the permeation rate Q of the gas that had permeated the membrane was calculated by the following formula, and the separation factor α was calculated as the ratio of permeation rate between carbon dioxide and methane. Note that the abbreviation "STP" means standard conditions. The membrane area was calculated from the outer diameter of the separation membrane and the length of the region contributing to gas separation in the separation membrane.

Permeation rate $Q$=[gas permeation flow rate ($cm^3 \cdot STP$)]/[membrane area ($cm^2$)×time (s)× pressure difference (cmHg)

Then, the ratio of permeation rate between the obtained gases ($CO_2$ permeation rate/$N_2$ permeation rate) was calculated as the separation factor.

Example 1

Polyacrylonitrile (MW: 150,000) manufactured by Polysciences, Inc., polyvinylpyrrolidone (MW: 40,000) manufactured by Sigma-Aldrich Co. LLC., and, as a solvent, dimethyl sulfoxide (DMSO) manufactured by WAKENYAKU CO., LTD. were charged into a separable flask, and the mixture was stirred and refluxed to prepare a homogeneous, transparent solution. In this process, the concentrations of polyacrylonitrile and polyvinylpyrrolidone were both 11.5% by weight.

Using the obtained coating stock solution, a film was formed on the surface of a porous carbon core having a hollow fiber-shaped co-continuous porous structure by a nozzle coating method. The resulting product was infusibilized by heating at 240° C. in an oxygen atmosphere. Then, the product was subjected to a carbonization treatment by heating at 600° C. in a nitrogen atmosphere to form a separation layer including a dense carbon layer, whereby a separation membrane was obtained. The co-continuous porous structure of the core layer had a structural period of 193 nm, and the separation membrane had an average diameter of 331 μm.

In order to adhere particles to the dense carbon layer of the obtained separation membrane by a filtration method, one end of the obtained separation membrane was sealed, and the other end of the separation membrane was connected to a vacuum pump. The separation membrane was subjected to vacuum drawing at 0.05 MPa in a slurry containing nanosilica particles dispersed in water (SNOWTEX ZL manufactured by Nissan Chemical Corporation) to make the pressure in the hollow portion a negative pressure, and the particles were adhered to the dense carbon layer on the surface of the separation membrane.

The following matters were recognized by the observation with the scanning electron microscope: particles adhere to a surface of the dense carbon layer, a dense layer carbon layer has a recess, and at least part of the particles are embedded in the recess.

The occupancy of the dense carbon layer by the particles was 28%, and the particle size of the adhered particles was 93 nm, which was 1/3559 of the average diameter of the separation membrane. The separation factor of the obtained separation membrane was evaluated to be 0.89.

Example 2

Particles were again adhered to the hollow fiber carbon membrane for separation obtained in Example 1 by the same method as in Example 1.

The following matters were recognized by the observation with the scanning electron microscope: particles adhere to a surface of the dense carbon layer, a dense layer carbon layer has a recess, and at least part of the particles are embedded in the recess.

The occupancy of the dense carbon layer by the particles was 45%, and the particle size of the adhered particles was 93 nm, which was 1/3559 of the average diameter of the separation membrane. The separation factor of the obtained separation membrane was evaluated to be 1.44.

Example 3

To the separation membrane before adhesion of particles produced in Example 1, particles were adhered using a slurry containing two types of particles (SNOWTEX ZL manufactured by Nissan Chemical Corporation and ST-30L manufactured by Nissan Chemical Corporation) dispersed therein by the same method as in Example 1.

The following matters were recognized by the observation with the scanning electron microscope: particles adhere to a surface of the dense carbon layer, a dense layer carbon layer has a recess, and at least part of the particles are embedded in the recess.

The occupancy of the dense carbon layer by the particles was 30%, and the particle sizes of the adhered particles were 44 nm and 93 nm, which were 1/7523 and 1/3559 of the average diameter of the separation membrane, respectively. The separation factor of the obtained separation membrane was evaluated to be 1.08.

Comparative Example 1

A separation membrane was produced in the same manner as in Example 1 except that the treatment of adhering particles by the filtration method was not performed. The separation factor was evaluated to be 0.83.

DESCRIPTION OF REFERENCE SIGNS a: State in which particles are in direct contact with dense carbon layer
b: State in which particles are further deposited on particles in contact with dense carbon layer
A: Interface to which particles adhere
B: Interface reverse to interface to which particles adhere
F: Fitted straight line
X: X-axis
P: Point on interface A to which particles adhere
L: Shortest distance from point P to the other interface
$L_{min}$: Minimum value of L
$P_{min}$: Point on interface A at which distance L assumes minimum value
$L_{max}$: Maximum value of L
$P_{max}$: Point on interface A at which distance L assumes maximum value
M: Intersection point of X-axis and perpendicular drawn from $P\text{-}_{min}$ to X-axis
R: Inscribed circle
d: Diameter of inscribed circle R
s: Size of recess penetrating dense carbon layer

The invention claimed is:

1. A separation membrane comprising a separation layer including a dense carbon layer having a carbon component rate of 60% to 95% by weight,
wherein particles adhere to a surface of the dense carbon layer,
wherein the dense carbon layer has a recess, and at least part of the particles are embedded in the recess,
wherein the particles are carbon particles or metal oxide particles.

2. The separation membrane according to claim 1, wherein the particles have a particle size of 5 nm to 10 μm.

3. The separation membrane according to claim 1, wherein an occupancy of the surface of the dense carbon layer by the particles is 0.01% or more and 90% or less.

4. The separation membrane according to claim 1, wherein the particles are metal oxide particles.

5. The separation membrane according to claim 4, wherein the metal oxide particles are selected from the group consisting of $Al_2O_3$, $TiO_2$, $Bi_2O_3$, $CeO_2$, CoO, CuO, $Ho_2O_3$, ITO, MgO, $SiO_2$, $SnO_2$, $Y_2O_3$, and ZnO.

6. The separation membrane according to claim 1, having a fibrous shape.

7. The separation membrane according to claim 6, wherein the particles have a particle size of 1/30 or less of an average diameter of the fibrous separation membrane.

8. The separation membrane according to claim 6, having an average diameter of the fibrous separation membrane of 10 μm to 500 μm.

9. The separation membrane according to claim 1, comprising a core layer having a porous structure, and the separation layer including the dense carbon layer formed on a surface of the core layer.

10. The separation membrane according to claim 9, wherein the porous structure has a co-continuous porous structure.

11. The separation membrane according to claim 10, wherein the co-continuous porous structure has a structural period of 10 nm to 10 μm.

12. The separation membrane according to claim 9, wherein the core layer is a layer containing carbon as a main component.

13. A separation membrane comprising a separation layer including a dense carbon layer, wherein particles having a particle size of 5 nm to 10 μm adhere to a surface of the dense carbon layer, where the dense carbon layer has a recess, and at least part of the particles are embedded in the recess.

* * * * *

UNITED STATES PATENT AND TRADEMARK OFFICE
CERTIFICATE OF CORRECTION

PATENT NO. : 12,115,504 B2  
APPLICATION NO. : 17/055679  
DATED : October 15, 2024  
INVENTOR(S) : Yuki Yamashita et al.

Page 1 of 1

It is certified that error appears in the above-identified patent and that said Letters Patent is hereby corrected as shown below:

In the Claims

In Column 17, Line 33 of Claim 1: delete "wherein" and insert -- where --.

Signed and Sealed this  
Third Day of December, 2024

Katherine Kelly Vidal  
*Director of the United States Patent and Trademark Office*